(12) United States Patent
Feller et al.

(10) Patent No.: US 11,796,712 B2
(45) Date of Patent: Oct. 24, 2023

(54) SENSOR

(71) Applicant: Leuze electronic GmbH + Co. KG, Owen/Teck (DE)

(72) Inventors: Bernhard Feller, Friedberg (DE); Daniela Kessler, Laichingen (DE); Markus Ruff, Esslingen am Neckar (DE); Rolf Brunner, Eichenau (DE); Tanita Ruf, Wendlingen (DE); Joachim Koperski, Ottobrunn (DE); Andreas Jüttner, Munich (DE)

(73) Assignee: Leuze electronic GmbH + Co. KG, Owen/Teck (DE)

( * ) Notice: Subject to any disclaimer, the term of this patent is extended or adjusted under 35 U.S.C. 154(b) by 0 days.

(21) Appl. No.: 18/104,804

(22) Filed: Feb. 2, 2023

(65) Prior Publication Data
US 2023/0266496 A1    Aug. 24, 2023

(30) Foreign Application Priority Data

Feb. 22, 2022 (EP) .................................. 22157857

(51) Int. Cl.
*G01V 8/10* (2006.01)
*G01V 8/20* (2006.01)

(52) U.S. Cl.
CPC ...................... *G01V 8/20* (2013.01)

(58) Field of Classification Search
CPC ... G01V 8/10; G01V 8/18; G01V 8/20; G01V 8/26; G08B 13/183
See application file for complete search history.

(56) References Cited

U.S. PATENT DOCUMENTS

2008/0156968 A1\* 7/2008 Lohmann ............... G01V 8/20
250/221
2013/0214124 A1\* 8/2013 Mueller .................. G01V 8/20
250/206.1

\* cited by examiner

*Primary Examiner* — Kevin K Pyo
(74) *Attorney, Agent, or Firm* — Michael Soderman

(57) ABSTRACT

A sensor for detecting objects within a monitoring range, with sensor components and an evaluation unit (9). An object detection signal is generated in the evaluation unit (9) in dependence upon sensor signals from sensor components. A selector unit and an input interface (11) with mechanical setting element are provided, wherein a selection of a parameter set is made in the selector unit (10) from a number of preconfigured parameter sets in dependence upon a setting configuration of the mechanical setting element of the input interface. The selected parameter set is adopted for the functioning of the sensor.

25 Claims, 4 Drawing Sheets

SENSOR

CROSS REFERENCE TO RELATED APPLICATIONS

This application claims the priority of EP 22157857.8 filed on 2022 Feb. 22; this application is incorporated by reference herein in its entirety.

BACKGROUND

The invention relates to a sensor.

Such optical sensors are generally used for detecting objects within a monitoring range.

The sensor can be designed particularly as an optical sensor.

In the simplest embodiment, the optical sensor has only a light beam-emitting transmitter and a light beam-receiving receiver as sensor components. In this context, the optical sensor can be designed as a photoelectric proximity sensor, photoelectric distance sensor, retro-reflective sensor and similar, wherein in these embodiments, the transmitter and the receiver are integrated in a shared housing. Furthermore, the optical sensor can also be designed as a through-beam photoelectric sensor. In this case, the transmitters and receivers are housed in separate housings.

In general, the optical sensor can also have multiple transmitters and/or receivers. A light curtain is an example of such an optical sensor.

Typically the light curtain comprises a series arrangement of light beam-emitting transmitters in a first housing on one edge of the monitoring range and a series arrangement of light beam-receiving receivers in a second housing at the opposite edge of the monitoring range.

The optical sensor has an evaluation unit as an electronic component in which an object detection signal or measurement values in the form of distance values, object sizes, shadowed regions of the object or the like are generated in dependence upon receive signals of the one or more receivers. The object detection signal can be designed particularly as a binary switching signal, the switch states of which indicate whether an object is located within the monitoring range, or not. Alternatively, the object detection signal can be an analog signal, for example, a distance value.

A general requirement of such sensors is that their function must be adjusted to the given application.

Input interfaces with mechanical setting elements are provided for this purpose in known sensors. Such an input interface typically has a number of mechanical setting elements in the form of jumpers, wire bridges, or switches, particularly DIP switches.

Various input variants that a user can input manually are possible with the mechanical setting elements. Once the user has entered a specific input variant, a device configuration permanently assigned to this input variant is activated with which the sensor is then operated.

In this context, it is disadvantageous that only a limited number of input variants can be realized with the mechanical setting elements, such that the number of settable device configurations is also limited. Often it is therefore only possible to insufficiently adjust the sensors to the application.

SUMMARY

The invention relates to a sensor for detecting objects within a monitoring range, with sensor components and an evaluation unit (9). An object detection signal is generated in the evaluation unit (9) in dependence upon sensor signals from sensor components. A selector unit and an input interface (11) with mechanical setting element are provided, wherein a selection of a parameter set is made in the selector unit (10) from a number of preconfigured parameter sets in dependence upon a setting configuration of the mechanical setting element of the input interface. The selected parameter set is adopted for the functioning of the sensor.

DETAILED DESCRIPTION

The invention seeks to solve the problem of supplying a sensor of the type mentioned at the outset which can be adjusted to different applications flexibly and with minimal design effort.

The features of claim 1 are provided to solve this problem. Advantageous embodiments and useful further developments are provided in the dependent claims.

The invention relates to a sensor for detecting objects within a monitoring range, with sensor components and an evaluation unit. An object detection signal is generated in the evaluation unit in dependence upon sensor signals from sensor components. A selector unit and an input unit with mechanical setting element are provided, wherein a selection of a parameter set is made in the selector unit from a number of preconfigured parameter sets in dependence upon a setting configuration of the mechanical setting element of the input interface. The selected parameter set is adopted for the functioning of the sensor.

The sensor according to the invention serves to detect objects within a monitoring range. For this purpose, the sensor has sensor components and an evaluation unit, wherein an object detection signal is generated in the evaluation unit in dependence upon sensor signals.

The sensor has an input interface with a number of mechanical setting elements for setting the functioning of the sensor in an application-specific manner.

Using the mechanical setting elements of the input interface, a user can preset a certain setting configuration. In dependence upon this setting configuration, a selection of a parameter set from a number of preconfigured parameter sets takes place in the selector unit, wherein the selected parameter set is then adopted for the functioning of the sensor.

Therefore, the basic concept of the invention is that in contrast to known sensors, a specific preset device configuration of the sensor is not stored for every setting configuration of the mechanical setting elements of the input interface, such that upon setting the setting configuration, this device configuration is adopted for the sensor.

According to the invention, various parameter sets can be assigned to the individual setting configurations of the input interface with the selector unit. The capability to select parameter sets and assign them to setting configurations of the input interface enabled by the selector unit therefore makes available a significantly larger number of parameter sets which can be selected by a user by means of setting configurations of the input interface. This enables significantly expanded and improved adjustment of the sensor to various applications.

Particularly preferably, a number of preconfigured parameter sets can be selected from a total number of parameter sets with the selector unit.

The total number of available parameter sets is typically significantly greater than the number of setting configurations that can be set using the mechanical setting elements of the input interface. All parameter sets are preconfigured, i.e., with them, an executable device function of the sensor can be preset. A number of preconfigured parameter sets can be selected from the total number of preconfigured parameter sets using a selector method stored in the selector unit, the number of the former advantageously corresponding to the number of setting configurations of the input interface, such that a user can select a preconfigured parameter set of his choice which is then adopted for the functioning of the sensor. Advantageously, the selection performed by means of the selector is adapted to the possible applications of the sensor. The user can then select the parameter set he desires from the quantity of suitable parameter sets by setting the setting configuration on the input interface.

Particularly advantageously, the assignment of parameter sets to mechanical setting elements of the input interface is preset by means of the selector unit.

Therefore, not only is a selection of preconfigured parameter sets selected from a total number of parameter sets using the selector unit, but rather the selected parameter sets are also assigned to individual mechanical setting elements by means of the selector unit, such that a complete presetting of parameter sets is performed with the selector unit which can then be selected individually by a user without further measures by setting the setting configuration of the input interface, in order to adopt a parameter set for the functioning of the sensor.

According to an advantageous further development, which mechanical setting elements of the input interface are to be evaluated is determined with the selector unit.

The selector unit is thereby additionally used to determine the functionality of the input interface.

The input interface expediently has an arrangement of wire bridges, jumpers, or switches as mechanical setting element.

The input interface designed in this manner is formed from standard components, the functionality of which is expanded by the selector unit.

According to an advantageous embodiment, the functionality of the selector unit can be parameterized.

The capability to parameterize the selector unit allows its functional scope to be changed, whereby a significant expansion is enabled with respect to the adjustment of the sensor to various applications.

A configuration interface is expediently provided for parameterizing the selector unit.

In this context, the configuration interface is a cabled or touchless interface.

USB or IO link interfaces are examples of cabled interfaces. Wireless interfaces or optical interfaces are examples of touchless interfaces.

A configuration device such as a laptop or PC, for example, with which the functionality of the selector unit can be preset, can generally be connected to the configuration interface.

In this context, particularly a selector method of the selector unit can be set through the parameterization.

Through the parameterization, therefore, the function of the selector unit can be changed such that the sensor becomes particularly adapted to certain applications.

For example, the selector method can be preset or changed to the effect that from among the total number of available parameter sets, it is possible to preset the type and composition of the preconfigured parameter sets from which the user selects a parameter set by presetting setting configurations of the mechanical setting elements of the input interface, which parameter set then determines the functioning of the sensor.

Similarly, assignments of setting configurations to certain preconfigured parameter sets can also be defined through the parameterization. Similarly, the mechanical setting elements or input interfaces that will be evaluated in the selection of parameter sets can be preset through the parameterization.

A selector method of the selector unit can also be provided through the parameterization.

The composition of the parameters forming a parameter set can be preset thereby.

A parameter set typically contains functional parameters or IO parameters.

For example, functional parameters can be parameters that establish the functioning of sensor components. For sensor components in the form of radiation-emitting transmitters, the transmission power can be preset as a functional parameter. For sensor components in the form of radiation-receiving receivers, the receive signal amplification can be preset as a functional parameter.

The resolution of the sensor can also be preset as a functional parameter. The reaction time of the sensor can also be preset as a functional parameter, such that, for example, there must be a number of, particularly sequential, object detections in order for an object detection signal to be generated.

IO parameters can generally be defined as certain functions that are assigned to inputs or outputs of the sensor.

Advantageously, the selector unit is parameterized during manufacturing of the sensor or at its place of use.

Therefore, the parameterization can be performed not only on the production line of the manufacturer, but rather also by the user who uses the sensor for application-specific monitoring purposes. Particularly advantageously, the sensor can be initially parameterized on the production line and the user can then perform a reparameterization, if needed.

According to an embodiment with a structurally advantageous design, the selector unit comprises a computing unit and memory units assigned to it in which parameter sets and configuration data for the functionality of the selector unit are stored.

The selector unit further comprises output means via which the parameters of the selected parameter set can be output for establishing the functioning of the sensor.

During a parameterization of the selector unit, the computing unit reads the corresponding data from the memory units and adopts the data for setting the functionality of the selector unit.

If a setting configuration has been preset during operation of the sensor, i.e., after parameterization was performed, with the mechanical setting elements of the input interface, the assigned parameter set is selected according to the setting configuration by means of the selector unit and adopted for the functioning of the sensor. For this purpose, the parameters of the parameter set are output via the output means and then adopted by the sensor, particularly its sensor components. The parameters can also be adopted for signal evaluation by the evaluation unit.

Particularly, it is also possible for the selector unit to be a component of the evaluation unit.

The sensor according to the invention can be designed particularly as a safety sensor, i.e., the sensor then has a failsafe structure such that it can be used in safety-related applications, for example, for protection of persons.

A failsafe structure is realized particularly through a redundant, advantageously dual-channel, structure of the evaluation unit, for example, in the form of two computing units cyclically monitoring one another.

If an error is detected by the computing units of the evaluation unit, the safety sensor enters the safe state, for example, in that it generates an object detection signal with which a monitored, hazardous machine is switched off.

The failsafe quality of the sensor can be augmented yet further when a test unit is provided by means of which the functioning of the input interface can be validated.

Particularly, test signals are generated in the test unit, which are output to a first mechanical setting element of the input interface, passed through all mechanical setting elements up to the last mechanical setting element, and read by the these back into the test unit.

Expediently, test signals that vary over time are provided.

The test signals read back into the test unit are compared to a defined expectation, wherein operation is error-free only when the read-back test signals meet the expectation. In event of error, the sensor transitions to the safe state.

To further augment the functionality, the test unit has a failsafe, redundant structure.

Particularly, the test unit is a component of the evaluation unit.

This is then particularly advantageous when the sensor is a safety sensor and the evaluation unit has a redundant structure, such that the test unit then also has a redundant structure.

In principle, the optical sensor according to the invention can be a radar sensor or an ultrasonic sensor. Particularly preferably, the sensor is an optical sensor.

The optical sensor can be designed as a photoelectric proximity sensor, photoelectric distance sensor, through-beam photoelectric sensor, retro-reflective sensor or also as a scanner, particularly an area distance sensor, or light curtain.

BRIEF DESCRIPTION OF THE DRAWINGS

The invention is explained in the following with reference to the drawings. They show.

DETAILED DESCRIPTION OF THE PREFERRED EMBODIMENTS

Figure 1:
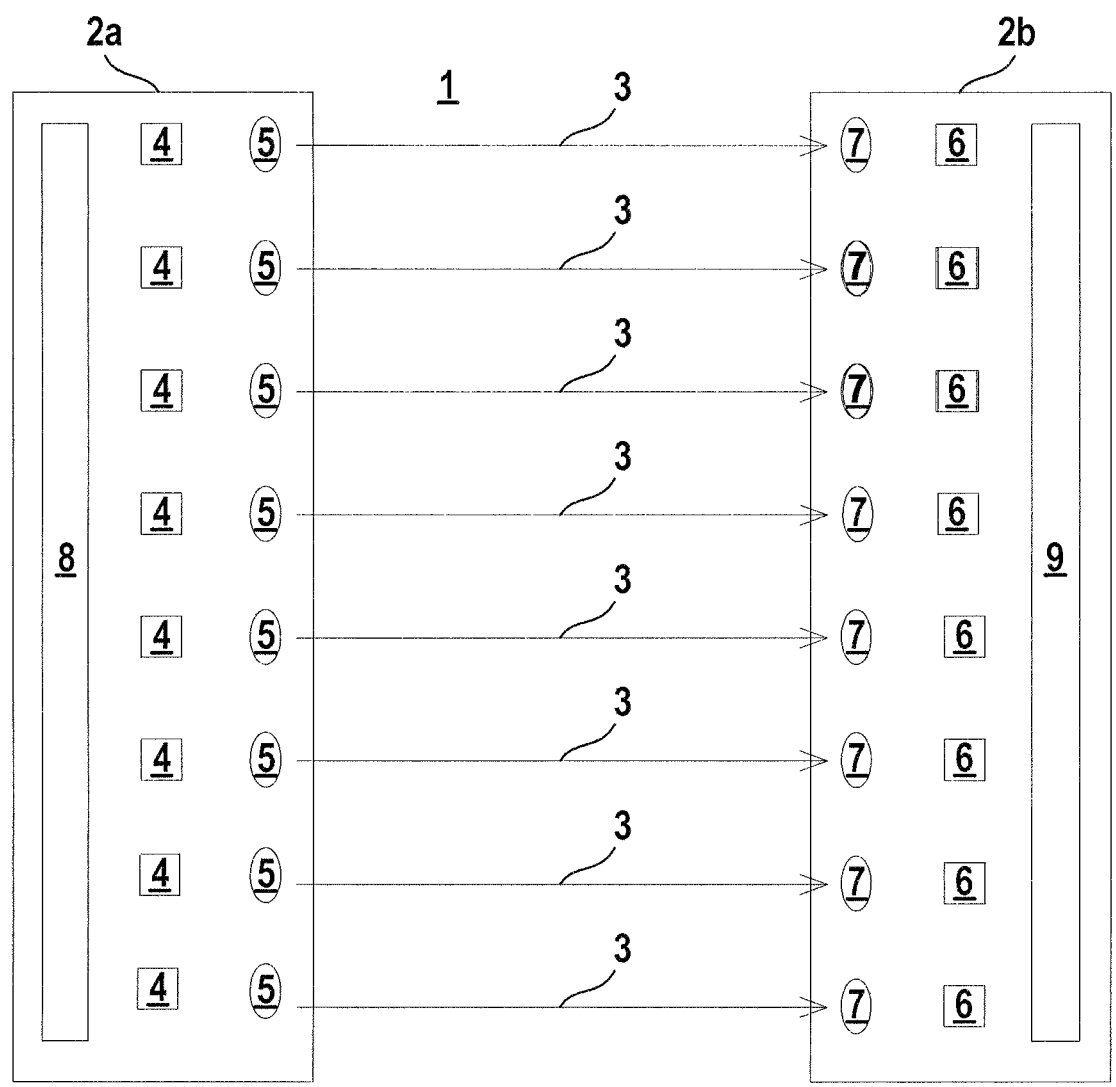
FIG. 1: An exemplary embodiment of the sensor according to the invention in the form of a light curtain

FIG. 1 shows schematically the structure of an exemplary embodiment of the sensor according to the invention in the form of a light curtain 1 for detecting objects within a monitoring range.

The light curtain 1 has a transmitter unit with a housing 2a, with a series arrangement of light beam 3-emitting transmitters 4 as first sensor components and optical elements assigned thereto forming transmission optics 5. Furthermore, the light curtain 1 has a receiver unit with a second housing 2b, with a series arrangement of light beam 3-receiving receivers 6 as second sensor components, in front of each of which an optical element is respectively arranged in the form of a receiving optics 7.

The housings 2a, 2b are arranged on opposite edges of the monitoring range such that a receiver 6 is arranged respectively opposite a transmitter 4 and with it forms a transmitter-receiver pair, wherein the light beams 3 of the transmitter 4 form a beam axis. In the present case, eight beam axes are provided. Naturally, the light curtain 1 can also have another number of beam axes.

Alternatively, the light curtain 1 can also be designed as a retro-reflective light curtain 1. In that case, all transmitters 4 and receivers 6 are arranged in a housing 2a or 2b that is arranged on an edge of the monitoring range. A reflector is located at the other end. When the monitoring range is free, the light beams 3 of the transmitter 4 are guided back via the reflector to the respectively assigned receiver 6.

The transmitters 4 are controlled by a transmitter control 8. An evaluation unit 9 is assigned to the receivers 6. In this context, the beam axes are individually activated in succession, cyclically. The evaluation unit 9 controls the receivers 6 and evaluates their received signals in order to generate an object detection signal in the form of a binary switching signal, the switching states of which indicate whether an object is located within the monitoring range, or not. When the monitoring range is free, the light beams 3 of the beam axes reach the receiver 6 of the respective beam axis unimpeded. When there is an intervening object, at least one beam axis is interrupted. The evaluation unit 9 can have a multichannel structure if the light curtain 1 forms a safety sensor. The transmitter control 8 or the evaluation unit 9 can particularly be composed of two computing units cyclically monitoring one another.

For example, a hazard zone at a machine is monitored with the light curtain 1 implemented as a safety sensor. Operation of the machine is only released when the monitoring range is free. If an error is discovered in the evaluation unit 9, a switching signal is generated in the light curtain 1 such that the machine is switched off, i.e., a transition to a safe state occurs.

Figure 2:
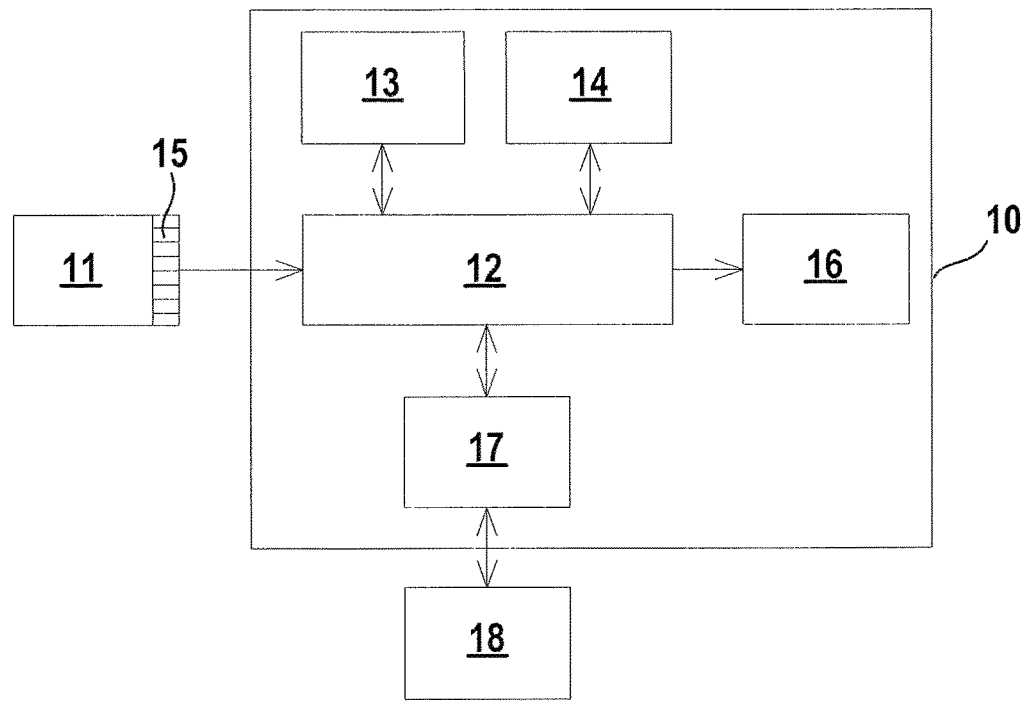
FIG. 2: A circuit diagram of a selector unit with an assigned input interface for the light curtain according to FIG. 1.

FIG. 2 shows an exemplary embodiment of a selector unit 10 with an assigned input interface 11 for the light curtain 1 according to FIG. 1.

The selector unit 10 has a processor unit 12, which in the simplest case can be formed by a controller or the like. In the present case, the processor unit 12 is formed by the computing units forming the redundant evaluation unit 9 of the light curtain 1. The other components of the selector unit 10 can also be integrated in the transmitter control 8 or evaluation unit 9 of the light curtain 1.

Furthermore, the selector unit 10 has a first memory unit 13 in which configuration data is stored for the selector methods that can be performed with the selector unit 10. Furthermore, the selector unit 10 has a second memory unit 14 in which parameter sets are stored for the light curtain 1. A store of parameter sets, i.e., a total number of parameter sets, for the light curtain 1 is stored in the memory unit 14. All stored parameter sets are preconfigured such that with them, respectively an operable device configuration of the light curtain 1 or of the sensor in general can be preset.

The parameter sets comprise functional parameters, i.e., parameters for the transmitters 4, their transmission powers, for example, for the receivers 6, their receive signal amplification, for example, and also for the signal evaluation performed in the evaluation unit 9, for example, resolution or reaction time for generating the object detection signal.

Application-specific parameters for muting or blanking the light curtain 1 can also be preset.

Muting refers to temporarily silencing individual or all beam axes of the light curtain 1, such that a permissible, non-hazardous object can pass through the light curtain 1 without it generating a switching signal.

Blanking is when some of the beam axes are interrupted by a non-hazardous object. In that case, an object detection signal is only generated with the light curtain 1 when not all hidden (blanked) beam axes are interrupted or when at least one non-blanked beam axis is interrupted.

The input interface 11, which has a number of mechanical setting elements, is connected to the processor unit 12 of the selector unit 10. The input interface 11 can have mechanical setting elements 15 in the form of wire bridges, jumpers, or switches, particularly DIP switches, that can be manually actuated by a user. Setting configurations, which are fed to the processor unit 12 of the selector unit 10, are generated by actuating mechanical setting elements 15. Advantageously, the setting options can also be mixed. For example, a setting can both be set via DIP switches and additionally via wire bridges.

Furthermore, output means 16 are connected to the processor unit 12 of the selector unit 10, via which output means 16 set parameters are output in order to set the functioning of the light curtain 1 accordingly.

Furthermore, the selector unit 10 has a configuration interface 17 which is connected to the processor unit 12. A configuration device 18, such as a laptop or PC, for example, can be connected to the configuration interface 17 for parameterizing the selector unit 10 or configuring setting parameters.

Figure 3:
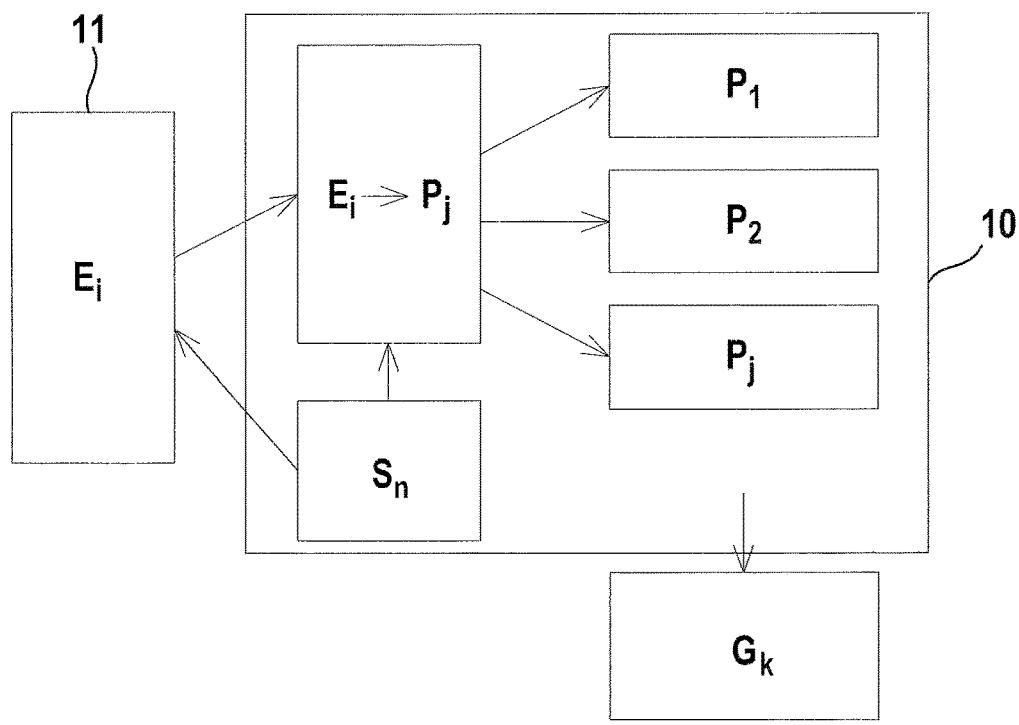
FIG. 3: A functional diagram of the selector unit according to FIG. 2.

FIG. 3 shows a functional diagram of the arrangement according to FIG. 2.

The selector unit 10 can be parameterized with the configuration devices 18 connected to the configuration interface 17, wherein a selector method $S_n$ is preset through the parameterization. Configuration data is read out of the memory unit 13 for parameterizing the selector unit 10. With the parameterization, an assignment effected by the selector unit 10 of setting configurations $E_i$ (i=1, 2, ... ), which are set with the mechanical setting elements 15 of the input interface 11, to selected parameter sets $P_j$ (j=1, 2, 3) selected from the total number of parameter sets stored in the memory unit 14, is established.

According to the selector method preset through parameterization, the selector unit 10 does not only preset the assignment of setting configurations $E_j$ to selected parameter sets $P_j$. Rather, the selector unit 10 also determines which of the mechanical setting elements 15 of the input interface 11 are evaluated in the process.

If a user inputs a setting configuration $E_j$ at the input interface 11 after parameterization was performed, i.e., during operation of the light curtain 1, the selector unit 10 activates the parameter set $P_j$ corresponding to this setting configuration $E_j$ and outputs the corresponding parameter via the output means 16, by which a corresponding device function $G_K$ of the light curtain 1 is automatically set.

Figure 4:
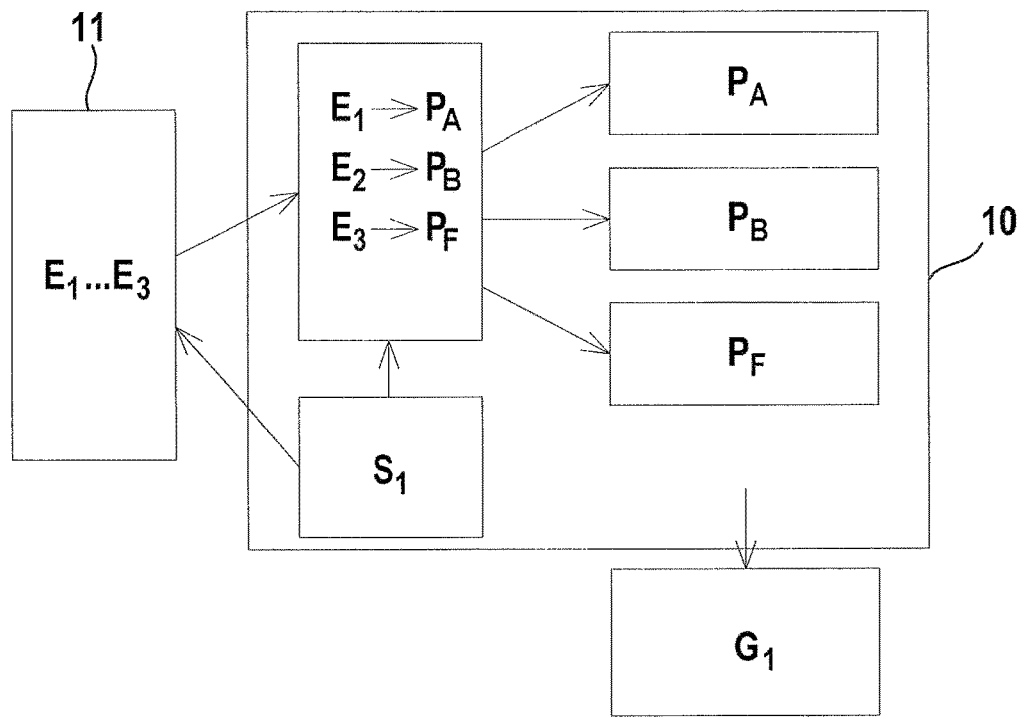
FIG. 4: A first example of a selector method for the selector unit according to FIGS. 2 and 3.
Figure 5:
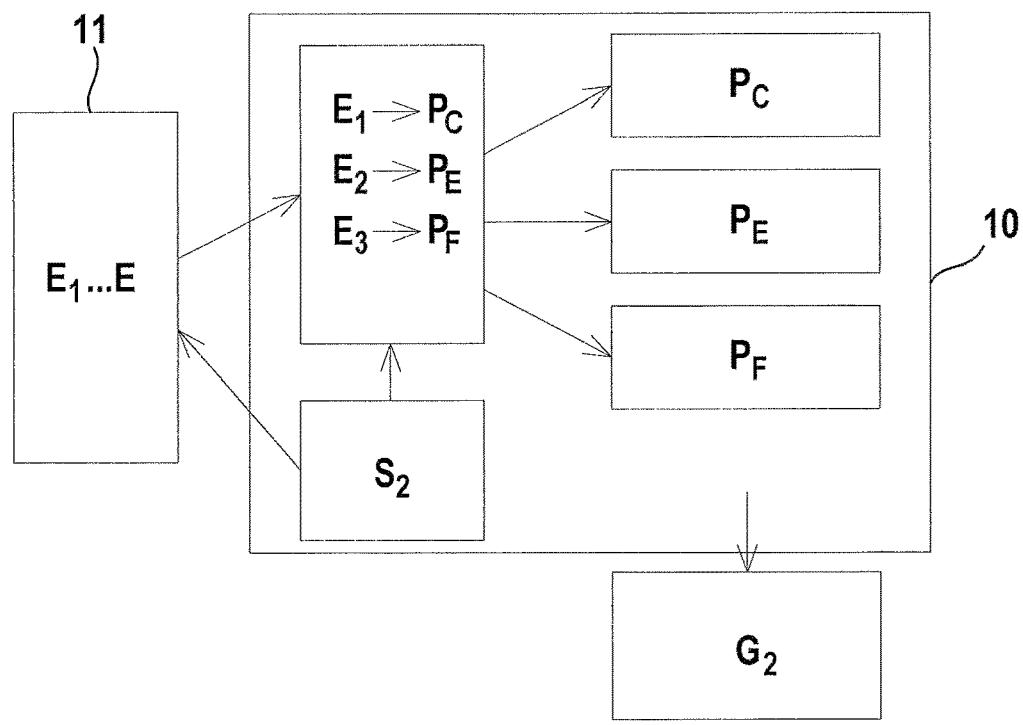
FIG. 5: A second example of a selector method for the selector unit according to FIGS. 2 and 3.

FIGS. 4 and 5 show two concrete application examples of this.

In the exemplary embodiment according to FIG. 4, three setting configurations $E_1$, $E_2$, $E_3$ are possible. By means of the selector method $S_1$ preset through parameterization, the parameter sets $P_A$, $P_B$, $P_F$ can be selected from the total number of parameter sets stored in the memory unit 14. Moreover, the setting configuration $E_1$ is assigned to the parameter set $P_A$, the setting configuration $E_2$ is assigned to the parameter set $P_B$ and the setting configuration $E_3$ is assigned to the parameter set $P_F$ by means of the selector unit 10.

For example, if a user selects the setting configuration $E_1$ at the input interface 11, the assignment of the setting configuration $E_1$ to the parameter set $P_A$ takes place in the selector unit 10 and that parameter set is then selected, such that with this $P_A$, the device configuration $G_1$ is established and activated, and the light curtain 1 is then operated with that device configuration.

In the exemplary embodiment according to FIG. 5, the three setting configurations $E_1$, $E_2$, $E_3$ are again possible. By means of the selector method $S_2$ preset through parameterization, the parameter sets $P_C$, $P_E$, $P_F$ can be selected from the total number of parameter sets stored in the memory unit 14. Moreover, the setting configuration $E_1$ is assigned to the parameter set $P_C$, the setting configuration $E_2$ is assigned to the parameter set $P_E$ and the setting configuration $E_3$ is assigned to the parameter set $P_F$ by means of the selector unit 10.

For example, if a user selects the setting configuration $E_2$ at the input interface 11, the assignment of the setting configuration $E_2$ to the parameter set $P_E$ takes place in the selector unit 10 and that parameter set is then selected, such that with this parameter set $P_E$, the device configuration $G_2$ is established and activated, and the light curtain 1 is then operated with that device configuration.

In addition, a different number of setting configurations (not shown) can also be preset through the parameterization of the selector unit 10.

Figure 6:
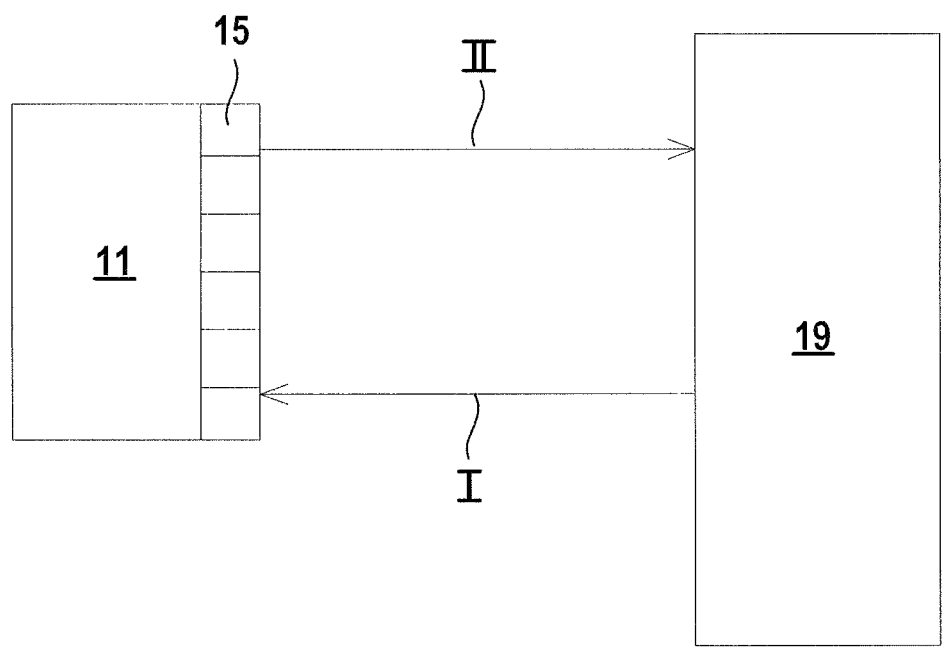
FIG. 6: An exemplary embodiment of a test unit for the light curtain according to FIGS. 1 and 2.

FIG. 6 shows an exemplary embodiment of a test unit 19 for the light curtain 1 according to FIGS. 1 and 2. In the present case, the test unit 19 is a component of the transmitter control 8 or evaluation unit 19 of the light curtain 1 designed as a safety sensor and accordingly, the test unit 19 has a failsafe, multichannel structure.

A functional validation of the input interface 11 is performed with the test unit 19. For this purpose, the test unit 19 outputs test signals to a first mechanical setting element 15 of the input interface 11 (arrow I in FIG. 6). The test signals are then passed through the mechanical setting elements 15 up to the last mechanical setting element 15 of the input interface 11, and from there are read back into the test unit 19 (arrow II in FIG. 6). In the present case, test signals varying over time are provided, which advantageously have a defined encoding. The read-back test signals are compared to defined expected signals in the test unit 19. The functioning of the input interface 11 is only error-free when the read-back test signals meet the expectation. If an error state is detected, the light curtain 1 switches to the safe state.

LIST OF REFERENCE NUMERALS (1) light curtain
(2a) housing
(2b) housing
(3) light beams
(4) transmitter
(5) transmission optics
(6) receiver
(7) receiving optics
(8) transmission control
(9) evaluation unit
(10) selector unit
(11) input interface
(12) processor unit

(13) memory unit
(14) memory unit
(15) mechanical setting element
(16) output means
(17) configuration interface
(18) configuration device
(19) test unit

The invention claimed is:

1. A sensor for detecting objects within a monitoring range, with sensor components and an evaluation unit (9), wherein an object detection signal is generated in the evaluation unit (9) in dependence upon sensor signals of sensor components, characterized in that a selector unit (10) and an input interface (11) with mechanical setting elements (15) are provided, wherein a selection of a parameter set is made in the selector unit (10) from a number of preconfigured parameter sets in dependence upon a setting configuration of the mechanical setting elements of the input interface, and the selected parameter set is adopted for the functioning of the sensor.

2. The sensor according to claim 1, characterized in that a number of preconfigured parameter sets can be selected from a total number of parameter sets with the selector unit (10).

3. The sensor according to claim 1, characterized in that the assignment of setting configurations of the mechanical setting elements (15) of the input interface (11) to preconfigured parameter sets is established by means of the selector unit (10).

4. The sensor according to claim 1, characterized in that which mechanical setting elements (15) of the input interface (11) are to be evaluated is determined with the selector unit (10).

5. The sensor according to claim 1, characterized in that the input interface, as mechanical setting element (15), has an arrangement of wire bridges, jumpers, or switches.

6. The sensor according to claim 1, characterized in that the functionality of the selector unit (10) can be parameterized.

7. The sensor according to claim 6, characterized in that a configuration interface (17) is provided for parameterizing the selector unit (10).

8. The sensor according to claim 7, characterized in that the configuration interface (17) is a cabled or touchless interface.

9. The sensor according to claim 6, characterized in that a selector method of the selector unit (10) is preset through the parameterization.

10. The sensor according to claim 6, characterized in that preconfigured parameter sets are preset through the parameterization of the selector unit (10).

11. The sensor according to claim 1, characterized in that a parameter set contains functional parameters or IO parameters.

12. The sensor according to claim 6, characterized in that the selector unit (10) is parameterized during the manufacturing of the sensor or at its place of use.

13. The sensor according to claim 1, characterized in that the selector unit (10) has a computing unit and memory units (13, 14) assigned to it in which parameter sets and configuration data are stored for the functionality of the selector unit (10).

14. The sensor according to claim 1, characterized in that the selector unit (10) has output means (16) via which the parameters of the selected parameter set can be output for establishing the functioning of the sensor.

15. The sensor according to claim 1, characterized in that the selector unit (10) is a component of the evaluation unit (9).

16. The sensor according to claim 1, characterized in that a test unit (19) is provided, by means of which the functioning of the input interface (11) can be validated.

17. The sensor according to claim 16, characterized in that test signals are generated in the test unit (19), the test signals are output to a first mechanical setting element (15) of the input interface (11) and are read back into the test unit 19.

18. The sensor according to claim 17, characterized in that test signals are generated in the test unit (19), the test signals are output to a first mechanical setting element (15) of the input interface (11), are passed through multiple or all mechanical setting elements (15), and read back by these into the test unit (19).

19. The sensor according to claim 17, characterized in that test signals that vary over time are provided.

20. The sensor according to claim 16, characterized in that the test unit (19) has a failsafe, redundant structure.

21. The sensor according to claim 16, characterized in that the test unit (19) is a component of the evaluation unit (9).

22. The sensor according to claim 1, characterized in that it is a safety sensor.

23. The sensor according to claim 22, characterized in that the evaluation unit (9) has a failsafe, redundant design.

24. The sensor according to claim 1, characterized in that it is an optical sensor.

25. The sensor according to claim 24, characterized in that the optical sensor is a light curtain (1).

* * * * *